Jan. 23, 1923.

C. H. CARLISLE.
FLEXIBLE BELT.
FILED JUNE 18, 1918.

1,442,924.

WITNESSES

INVENTOR
CLIFTON H. CARLISLE.
BY Featherstonhaugh & Co
ATTYS.

Patented Jan. 23, 1923.

1,442,924

UNITED STATES PATENT OFFICE.

CLIFTON HUGH CARLISLE, OF TORONTO, ONTARIO, CANADA, ASSIGNOR TO THE GOODYEAR TIRE & RUBBER COMPANY OF CANADA, LIMITED, OF NEW TORONTO, ONTARIO, CANADA, A CORPORATION.

FLEXIBLE BELT.

Application filed June 18, 1918. Serial No. 240,630.

*To all whom it may concern:*

Be it known that I, CLIFTON HUGH CARLISLE, a citizen of the United States of America, and resident of the city of Toronto, Province of Ontario, Dominion of Canada, have invented certain new and useful Improvements in Flexible Belts, of which the following is a specification.

This invention relates to improvements in straps, belts and like articles, and is adapted for use as tug straps, lines, reins, and generally in harness making, and also capable of being used on machine driving belts or in belts utilized in power transmission.

In harness making when the several parts are made of leather, the harness is usually rather heavy and requires frequent cleaning, polishing and lubricating to keep it in good order, the leather absorbing sweat being extremely liable to rot and deteriorate unless very carefully attended to, whereas by the adoption of the present invention in harness making, a light and durable harness is obtained which is impervious to water and does not require to be lubricated or attended to, to the same extent as leather, while the lifetime is greatly in eccess of that of leather.

Further objects are to render the strap, belt or like article, strong and durable, yet possessing great lightness and flexibility so that the strap or belt will readily conform to the desired shape and permit of the tractive or driving force being transmitted in the desired direction without liability of the belt or strap chafing, and the lifetime of the same being shortened in consequence thereof.

Further objects still are to permit of the belt being readily bent or twisted in any direction so that it can be readily used in power transmission as in a machine driving belt where it may be subjected to contrary flection without any liability of cracking or rupture of the belt taking place, and generally to better adapt the straps or belts to better perform the functions required of them.

With the above and other objects in view, the invention consists of a composite rubber, fabric, and a specially braided wire arranged, all as hereinafter more particularly described in the specification and accompanying drawing.

Like characters of reference refer to like parts in the several figures.

Figure 1:
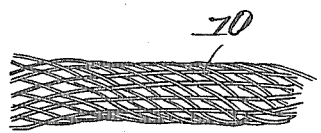
Figure 1 is a plan view of the braided wire used in my invention.
Figure 5:
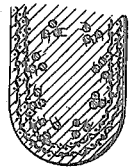
Figure 5 is a view similar to Figure 4, showing the reinforcing element to be of tubular form as distinguished from the flat formation shown in Figure 4.
Figure 2:
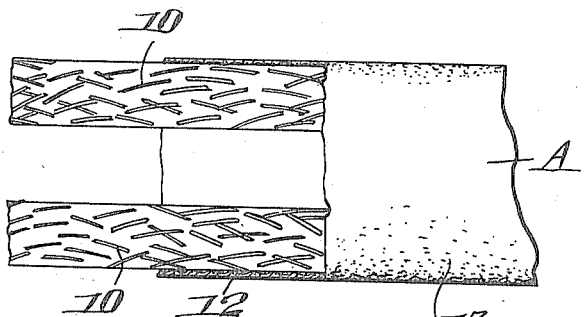
Figure 2 is a plan view of the braided wire after being treated with rubber and enveloped in canvas.
Figure 4:
Figure 4 is a cross-sectional view through one of the reinforcing elements and the material surrounding the same.
Figure 3:
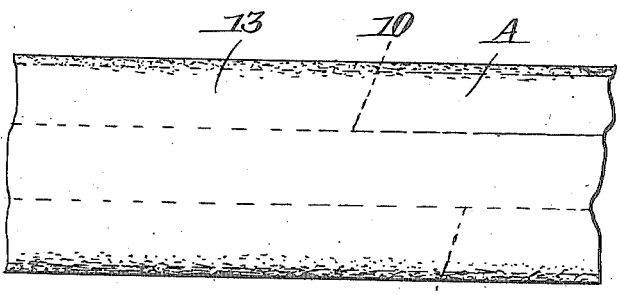
Figure 3 is a plan view of a belt or strap constructed after my invention.

Referring to the drawings, A represents a belt or strap of composite material, which in the embodiment illustrated comprises one or more pieces of a specially braided spring wire 10 which is treated with rubber, the said rubber being forced between the wire forming the braid, after which the braid is enveloped in fabric 12 which is embedded into the wire and rubber by the application of pressure and heat as shown to advantage in Fig. 4.

This braid is now built into the belt being enveloped in friction or surface fabric 13 and heat and pressure are applied to the belt to complete the manufacture of the same. The friction or surface fabric 13 forms a woven surface for the belt, while the fabric 12 assists in holding the rubber and braided wire together.

It should be particularly noted that the braid consists of a plurality of wires interwoven with each other so that the wires are of great length, thus giving to the belt when finished great elasticity with the result that the braid acts as a shock absorber and prevents a stress from being suddenly applied to the belt, which stress might otherwise tend to rupture or destroy the belt.

When a pull is applied to the belt, the braid contracts to a certain extent laterally, but the rubber which is pressed between the strands of wire forming the braid prevents this contraction taking place beyond predetermined limits, as the rubber offers a certain resistance to this motion of the braid, while the resiliency of the braid is such that the outer contour of the belt will not change after the load has been removed.

It is also found that belts are extremely liable to deteriorate when utilized for driving belts, and this may be due to the belt being subject to a contrary flection, so that the belt ultimately gives way under excessive pulling stresses, but by using a braided wire such as I build into the belt, and since each strand of the wire is of great length and interwoven backwardly and forwardly with each other, the belt cannot suffer from excessive pulling stresses no matter how it is bent or twisted.

The strength of the belt also compares very favorably with leather belting and is in fact much stronger being built to stand stresses which would break an ordinary leather, or other type of belt.

It will be seen that the strands of the braided wire 10 extend substantially diagonally from one side edge to the other, which permits the band of braid or woven ribbon to expand laterally. It also provides for a certain degree of longitudinal expansion, since, as the woven band is stretched in a longitudinal direction it may contract slightly, and this simultaneously increases its length.

When fastening means are applied to the belt they may be inserted through the strands of the woven wire, which provide an effective means of holding the same in position.

While the belt has been described as being manufactured with rubber, it is to be understood that any other similar resilient material might be used, such as rubber substitutes, rubber compounds, combinations of rubber, and fabric.

As many changes could be made in the above construction and many apparently widely different embodiments of my invention, within the scope of the claims, constructed, without departing from the spirit or scope thereof, it is intended that all matter contained in the above specification and accompanying drawings shall be interpreted as illustrative and not in a limiting sense.

What I claim as my invention is:

1. A belt comprising a band of wire with the wire braided diagonally, rubber surrounding the braided wire, and filling the interstices thereof, a fabric covering enveloping the wire and rubber and pressed into engagement therewith, and a second friction fabric forming the surface of the belt and enclosing the first mentioned fabric and the wire, the belt as a whole being laterally expansible and longitudinally distensible.

2. A laminated belt construction for power transmitting purposes, comprising a layer of rubber and a layer of parallel strain resisting cord members embedded in the rubber, said cord members being made of elements braided in cord form.

In witness whereof I have hereunto set my hand.

CLIFTON HUGH CARLISLE.